(12) United States Patent
Kwak et al.

(10) Patent No.: US 8,008,376 B2
(45) Date of Patent: Aug. 30, 2011

(54) PLASTICIZER COMPOSITION CONTAINING CYCLODEXTRIN DERIVATIVES, FLEXIBLE PVC COMPOSITION WITH SUPPRESSION OF THE MIGRATION OF PLASTICIZER CONTAINING THE SAME, AND MANUFACTURING METHOD THEREOF

(75) Inventors: Seung-Yeop Kwak, Seoul (KR); Sung-Ho Kim, Seoul (KR); Seok-Bong Lee, Daegu (KR)

(73) Assignee: Seoul National University Industry Foundation, Seoul (KR)

( * ) Notice: Subject to any disclaimer, the term of this patent is extended or adjusted under 35 U.S.C. 154(b) by 284 days.

(21) Appl. No.: 12/086,037

(22) PCT Filed: Dec. 7, 2005

(86) PCT No.: PCT/KR2005/004189
§ 371 (c)(1),
(2), (4) Date: Jun. 3, 2008

(87) PCT Pub. No.: WO2007/066839
PCT Pub. Date: Jun. 14, 2007

(65) Prior Publication Data
US 2009/0281214 A1 Nov. 12, 2009

(51) Int. Cl.
*C08B 37/00* (2006.01)
*C08L 3/02* (2006.01)
*C08L 5/16* (2006.01)
*C08F 251/00* (2006.01)
*C08F 251/02* (2006.01)
(52) U.S. Cl. .................... 524/48; 527/300; 527/313
(58) Field of Classification Search .............. 524/48; 527/300, 313
See application file for complete search history.

(56) References Cited

U.S. PATENT DOCUMENTS 5,319,028 A * 6/1994 Nakamura et al. ............ 525/227
5,376,707 A 12/1994 Nakatsuji et al.
(Continued)

FOREIGN PATENT DOCUMENTS

JP 01-132637 5/1989
(Continued)

OTHER PUBLICATIONS

Allsopp et al., Vinyl Chloride Polymers, Encyclopedia of Polymer Science and Technology, John Wiley and Sons, 2002.*
(Continued)

*Primary Examiner* — Mark Eashoo
*Assistant Examiner* — Liam J Heincer
(74) *Attorney, Agent, or Firm* — Edwards Angell Palmer & Dodge LLP; Kongsik Kim

(57) ABSTRACT

Disclosed are plasticizer compositions including cyclodextrin derivatives, a flexible PVC composition with suppression of the migration of a plasticizer containing the same, and a manufacturing method thereof. The manufacturing method of the flexible PVC composition of the present invention includes steps of (S1) preparing cyclodextrin derivatives; (S2) mixing the cyclodextrin derivatives, PVC and a low molecular weight liquid plasticizer to form a plastisol; and (S3) heating the plastisol to form a solution and cooling the solution. The manufacturing method PVC-1 of the present invention may be useful to mass-produce flexible PVC with suppression of the migration of a plasticizer in a simple and economic manner without using solvents since the cyclodextrin derivatives are used as a compound that can suppress the migration of a plasticizer. The flexible PVC has an effect of reducing an amount of the migrated plasticizer without deterioration in its physical properties.

13 Claims, 5 Drawing Sheets

U.S. PATENT DOCUMENTS

| | | | |
|---|---|---|---|
| 5,696,186 A | | 12/1997 | Videau |
| 5,739,203 A | * | 4/1998 | Ngoc .......................... 524/527 |
| 5,777,003 A | * | 7/1998 | Haas et al. .................... 523/223 |
| 7,605,199 B2 | * | 10/2009 | Wood et al. ...................... 524/48 |
| 2005/0090170 A1 | * | 4/2005 | Jackson ........................ 442/218 |
| 2005/0113511 A1 | * | 5/2005 | Mead et al. ................... 524/569 |
| 2005/0222347 A1 | * | 10/2005 | Pfaendner et al. .............. 526/82 |
| 2007/0043153 A1 | * | 2/2007 | Kruse et al. ................... 524/376 |
| 2008/0194784 A1 | * | 8/2008 | Choi et al. .................... 527/300 |
| 2008/0200592 A1 | * | 8/2008 | Kwak et al. ..................... 524/48 |
| 2009/0286908 A1 | * | 11/2009 | Kwak et al. ..................... 524/48 |

FOREIGN PATENT DOCUMENTS

| | | |
|---|---|---|
| JP | 09-241598 | 9/1997 |
| WO | WO 03018684 A2 * | 3/2003 |

OTHER PUBLICATIONS

Sreenivasan, "Effect of Bleeding β-Cyclodextrin with Poly(vinyl chloride) on the Leaching of Phthalate Ester to Hydrophilic Medium", J. of Applied Polymer Science, vol. 59, 2089-2093 (1996).

* cited by examiner

PLASTICIZER COMPOSITION CONTAINING CYCLODEXTRIN DERIVATIVES, FLEXIBLE PVC COMPOSITION WITH SUPPRESSION OF THE MIGRATION OF PLASTICIZER CONTAINING THE SAME, AND MANUFACTURING METHOD THEREOF

TECHNICAL FIELD

The present invention relates to a method for manufacturing a flexible PVC composition prepared by mixing PVC with a low molecular weight liquid plasticizer, and more particularly to a plasticizer composition capable of suppressing the migration of a plasticizer since a low molecular weight liquid plasticizer is mixed with a cyclodextrin derivative to form a complex, a method for manufacturing a flexible PVC composition with suppression of the migration of a plasticizer containing the same, and a flexible PVC composition with suppression of the migration of a plasticizer formed therefrom.

BACKGROUND ART

For example, PVC is a typical polymer that has been widely used for pipes for piping systems, food packaging materials, textile fibers, home decorations, blood storage containers, and infant articles such as nursing bottles, toys, etc. However, PVC has certain hardness due to the limit of its molecular mobility since a unique hierarchy structure and microcrystallite are present in the PVC, the microcrystallite playing a role in its physical crosslinks. Therefore, a flexible characteristic should be given to the PVC by means of a plasticization process in order to apply to flexible products such as food package films. A flexible PVC is generally manufactured by mixing a low molecular weight liquid plasticizer with PVC to form a plastisol, followed by heating the resultant plastisol to dissolve the PVC into the low molecular weight liquid plasticizer and cooling the plastisol. A phthalate plasticizer, a phosphate plasticizer, a trimellitate plasticizer, an aliphatic diester plasticizer, etc. has been widely known as the low molecular weight liquid plasticizer, and there are also an epoxy plasticizer, an anti-chlorine plasticizer, etc in addition to the above plasticizers. The flexibility is given to the PVC since its molecular mobility is significantly improved when a low molecular weight liquid plasticizer is added to the PVC.

As described above, the low molecular weight liquid plasticizer may very effectively used for softening PVC, but has characteristics that it is volatile in the air due to inherent characteristics of low molecular weight liquid materials, or it is transferred to the outside of the PVC when it is in contact with liquid or solid materials. It has been reported that the plasticizer migrated to the outside of the PVC is very harmful to the plants and the animals since it inhibits the normal activity of the endocrine system which is directly involved in their life activities or induces the abnormal activity of the endocrine system when the plasticizer is permeated into the bodies of plants and animals including human beings.

Accordingly, there have been continuous attempts to suppress the migration of a plasticizer.

For example, there have been attempts to substitute a low molecular weight liquid plasticizer with a high molecular weight plasticizer in order to solve the migration of plasticizers from PVC products. However, the problem is that, when the high molecular weight plasticizer is used in the PVC products, its economic efficiency is low or its plastic performance is not sufficient, and the chain entanglement appears in the high molecular weight plasticizer.

Meanwhile, it has been reported that cyclodextrin may contribute to suppressing the migration of plasticizers from flexible PVC since the cyclodextrin forms a complex with a low molecular weight liquid plasticizer such as DOP, as disclosed in Journal of Applied Polymer Science, 1996, Vol. 59, P. 2089 "Effect of blending β-cyclodextrin with poly (vinyl chloride) on the leaching of phthalate ester to hydrophilic medium".

As shown in α-cyclodextrin of the following Formula 1, the cyclodextrin is a cyclic compound composed of glucose groups as a repeating unit, and represented by the following Formula 2.

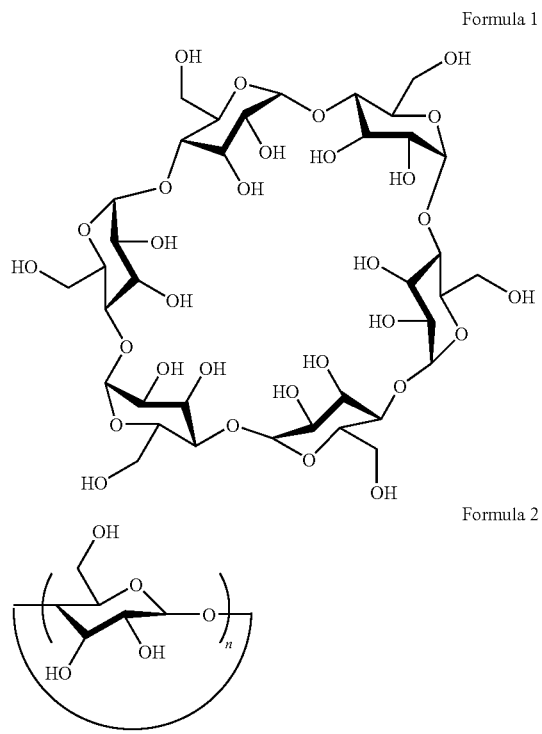

Formula 1

Formula 2 wherein, "n" represents the number of the repeating units of glucose groups, and is an integer from 6 to 26, and preferably from 6 to 8.

The cyclodextrin has a unique structure composed of an outer part surrounded by hydrophilic hydroxy functional groups; and a hydrophobic cavity. The cyclodextrin may form a complex with a plasticizer having a suitable size for entering the cavity, namely a low molecular weight liquid plasticizer. In addition that the cyclodextrin derivatives attract the low molecular weight liquid plasticizer into their cavities, the cyclodextrin derivatives also attract and fix the low molecular weight liquid plasticizer by means of hydrogen bonds, etc.

However, if the cyclodextrin is mixed with the PVC and the low molecular weight liquid plasticizer, they cohere to each other due to low dispersibility, and therefore an effect on the suppression of the migration of the plasticizer is significantly poor, and physical properties of the manufactured flexible PVC are also deteriorated. In order to solve the problems, a flexible PVC with suppression of the migration of a plasticizer was manufactured using a method including steps of dispersing PVC, DOP and cyclodextrin in a dimethylacetamide (DMAc) solvent and casting the resultant mixture, as disclosed in the above literature. However, the method has also problems that its economic efficiency is low and it is difficult to mass-produce PVC products, as well as the cohesion of the cyclodextrin is not completely solved.

DISCLOSURE OF INVENTION

Accordingly, the present invention is designed to solve the problems of the prior art, and therefore it is an object of the present invention to provide a method for manufacturing a flexible PVC composition with suppression of the migration of a plasticizer, the flexible PVC composition being capable of mass-producing a flexible PVC in a simple and economic manner without using solvents and highly suppressing the migration of a plasticizer without deterioration in physical properties of the manufactured flexible PVC.

It is another object of the present invention to provide a plasticizer composition capable of suppressing the migration of a plasticizer without deterioration in physical properties of the composition since a low molecular weight liquid plasticizer is mixed with a cyclodextrin derivative to form a complex, and a flexible PVC composition with suppression of the migration of a plasticizer containing the same.

In order to accomplish the above object, the present invention provides a method for manufacturing a flexible PVC composition with suppression of the migration of a plasticizer, the method including:

(S1) preparing cyclodextrin derivatives represented by the following Formula 3;

(S2) mixing the cyclodextrin derivatives, PVC and a low molecular weight liquid plasticizer to form a plastisol; and (S3) heating the formed plastisol to form a solution and cooling the solution:

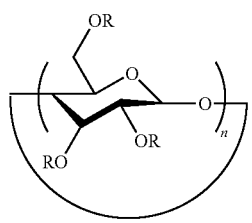

Formula 3 wherein, R is independently selected from the group consisting of hydrogen, a hydrocarbon functional group having 1 to 20 carbon atoms represented by the following Formula 4, and a silane functional group having 1 to 60 carbon atoms represented by the following Formula 5, where the substituent "R" has a substitution degree of 5 to 100%; and n is an integer from 6 to 26:

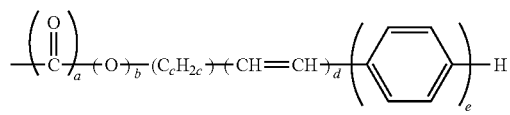

Formula 4 and wherein, a, b, c, d and e are each an integer having a value of at least 0, where the sum of a+b+c+d+e is at least 1, and the linking order of the constituent units a, b, c, d and e is randomly changed:

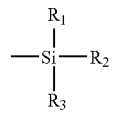

Formula 5 wherein, $R_1$, $R_2$ and $R_3$ are each independently a hydrocarbon functional group having 1 to 20 carbon atoms represented by the Formula 4.

According to the manufacturing method of the present invention, the flexible PVC with suppression of the migration of a plasticizer may be mass-produced in a simple and economic manner without using solvents, and the migration of the plasticizer may be highly suppressed without deterioration in physical properties of the manufactured flexible PVC.

In the method for manufacturing a flexible PVC composition with suppression of the migration of a plasticizer according to the present invention, the cyclodextrin derivatives preferably have a content of 2 to 20 mol, based on 100 mol of the low molecular weight liquid plasticizer.

In the method for manufacturing a flexible PVC composition with suppression of the migration of a plasticizer according to the present invention, the low molecular weight liquid plasticizer includes phthalate plasticizers such as dimethyl phthalate (DMP), dibutyl phthalate (DBP), di-isobutyl phthalate (DIBP), dihexyl phthalate (DHP), dioctyl phthalate (DOP), di-iso-octyl phthalate (DIOP), dinonyl phthalate (DNP), di-isodecyl phthalate (DIDP), benzyl butyl phthalate (BBP), etc.; aliphatic diester plasticizers such as dioctyl adipate (DOA), di-iso-octyl adipate (DIOA), di-isodecyl adipate (DIDA), etc.; trimellitate plasticizers such as tri-iso-octyl trimellitate (TIOTM), etc.; and phosphate plasticizers such as tritolyl phosphate (TTP), trixylyl phosphate (TXP), etc., and they may be used alone or in combinations thereof.

BEST MODES FOR CARRYING OUT THE INVENTION

Figure 1:
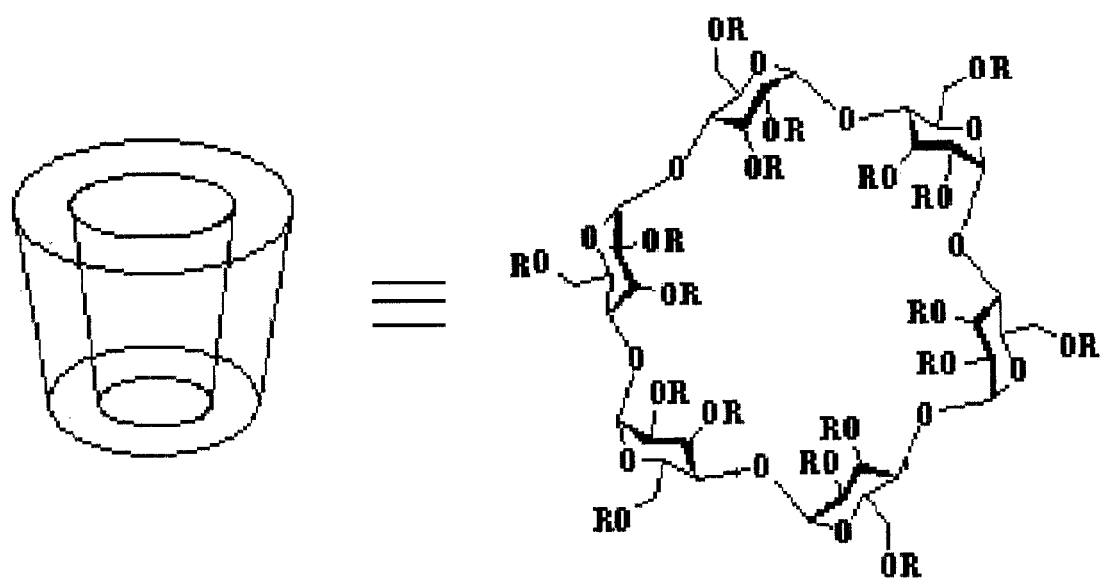
FIG. 1 is a schematic diagram showing a structure of α-cyclodextrin derivatives as one example of cyclodextrin derivatives used in the present invention.

Hereinafter, a method for manufacturing a flexible PVC composition with suppression of the migration of a plasticizer according to the present invention will be described in detail with reference to the accompanying drawings.

Firstly, cyclodextrin derivatives represented by the following Formula 3 are prepared (S1).

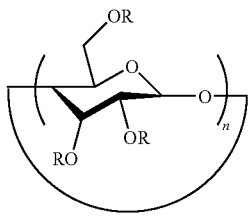

Formula 3

In the Formula 3, R may be independently hydrogen, a hydrocarbon functional group having 1 to 20 carbon atoms represented by the following Formula 4, or a silane functional group having 1 to 60 carbon atoms represented by the following Formula 5. n is an integer from 6 to 26, and preferably from 6 to 8. The substituent "R" has a substitution degree of 5 to 100%, and preferably from 20 to 90%, and the substitution degree is calculated according to the following Equation 1, as follows.

$$\text{Substitution Degree} = \left( \frac{\text{Total No. of Substituted Hydroxy Group}}{\text{Total No. of Hydroxy Group in Cyclodextrin}} \right) \times 100 (\%)$$

Equation 1

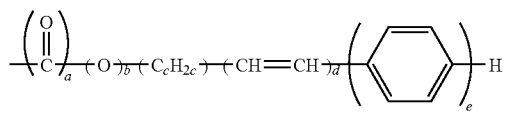

Formula 4

In the Formula 4, a, b, c, d and e are each an integer having a value of at least 0, where the sum of a+b+c+d+e is at least 1. That is to say, the linking order of the constituent units a, b, c, d and e is not limited to the Formula 4, but may be randomly changed. The hydrocarbon functional group represented by Formula 4 may include, but is not limited to, methyl, ethyl, butyl, octyl, decyl, hexadecyl, aryl, phenyl, benzyl, etc.

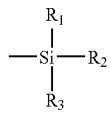

Formula 5

In the Formula 5, $R_1$, $R_2$ and $R_3$ are each independently a hydrocarbon functional group having 1 to 20 carbon atoms represented by Formula 4. The silane functional group represented by Formula 5 may include, but is not limited to, trimethyl silane, butyldimethyl silane, methoxy silane, ethoxy silane, methacryloxypropyl methoxy silane, etc.

Such cyclodextrin derivatives may be manufactured by reacting the cyclodextrin represented by the Formula 2 with the compound represented by the following Formula 6.

R—X            Formula 6

In the Formula 6, R is identical to the substituent "R" of the Formula 3, and X is a functional group that may react with a hydroxy group of the cyclodextrin represented by Formula 2, and may include, for example, halogen, a hydroxy group, an alkoxy group, etc. A hydrogen atom in the hydroxy group of the cyclodextrin is substituted with a substituent "R" by means of the above-mentioned substitution reaction. A degree in which the hydrogen atom is substituted with a substituent "R", namely a substitution degree of the substituent "R" may be adjusted according to a mole ratio of the added compound represented by the Formula 6 during the substitution reaction.

Subsequently, the prepared cyclodextrin derivatives, PVC and a low molecular weight liquid plasticizer are mixed to form a plastisol (S2).

Contrary to the pure cyclodextrin of the Formula 2, the cyclodextrin derivatives of the Formula 3, in which the hydrogen functional group is substituted with a predetermined compound, have a good dispersibility when they are mixed with the PVC and the low molecular weight liquid plasticizer. Accordingly, the plastisol, in which the cyclodextrin derivatives are homogeneously dispersed, may be formed without using a conventional solvent such as DMAc. Therefore, the flexible PVC with suppression of the migration of a plasticizer may be mass-produced in a simple and economic manner.

An amount of the mixed cyclodextrin derivatives preferably ranges from 2 to 20 mol, based on 100 mol of the low molecular weight liquid plasticizer.

Also, all plasticizers may be used as the low molecular weight liquid plasticizer if the plasticizers can form a complex in cavities of the cyclodextrin derivatives. Considering cavity sizes of the cyclodextrin derivatives, the used plasticizer may include, but is not limited to, conventional low molecular weight liquid plasticizers used for softening PVC, for example phthalate plasticizers such as dimethyl phthalate (DMP), dibutyl phthalate (DBP), di-isobutyl phthalate (DIBP), dihexyl phthalate (DHP), dioctyl phthalate (DOP), di-iso-octyl phthalate (DIOP), dinonyl phthalate (DNP), di-isodecyl phthalate (DIDP), benzyl butyl phthalate (BBP), etc.; aliphatic diester plasticizers such as dioctyl adipate (DOA), di-iso-octyl adipate (DIOA), di-isodecyl adipate (DIDA), etc.; trimellitate plasticizers such as tri-iso-octyl trimellitate (TIOTM), etc.; and phosphate plasticizers such as tritolyl phosphate (TTP), trixylyl phosphate (TXP), etc., and they are used alone or in combinations thereof. It is apparent to those skilled in the art that a mixed ratio of the low molecular weight liquid plasticizer to the PVC may be varied according to the desired softening degree of PVC products, and, for example, 10~80 parts by weight of the plasticizer is preferably mixed, based on 100 parts by weight of the PVC.

In the above-mentioned step S2, a plastisol may formed by mixing the cyclodextrin derivatives together with PVC and a low molecular weight liquid plasticizer, but a plastisol may formed by first mixing the cyclodextrin derivatives with a low molecular weight liquid plasticizer to form a plasticizer composition, followed by mixing the plasticizer composition with PVC. That is to say, a plasticizer composition including cyclodextrin derivatives and a low molecular weight liquid plasticizer may be first prepared according to the present invention, and then used instead of the conventional plasticizers of the PVC.

Finally, the resultant plastisol is heated to form a solution, and then the solution is cooled (S3).

When the plastisol, which is formed by adding the cyclodextrin derivatives of Formula 3 to the flexible PVC composition including PVC and a low molecular weight liquid plasticizer, is heated, for example, to about 180° C., the plastisol is changed to a phase of solution in which other components are dissolved with the low molecular weight liquid plasticizer, and, when the solution is then cooled, a flexible PVC composition with suppression of the migration of a plasticizer, in which all components of the PVC, the low molecular weight liquid plasticizer and the cyclodextrin derivatives are mixed homogeneously, is manufactured.

In the manufactured flexible PVC composition with suppression of the migration of a plasticizer, a principle of suppressing the migration of a plasticizer is described in brief, as follows.

Figure 2:
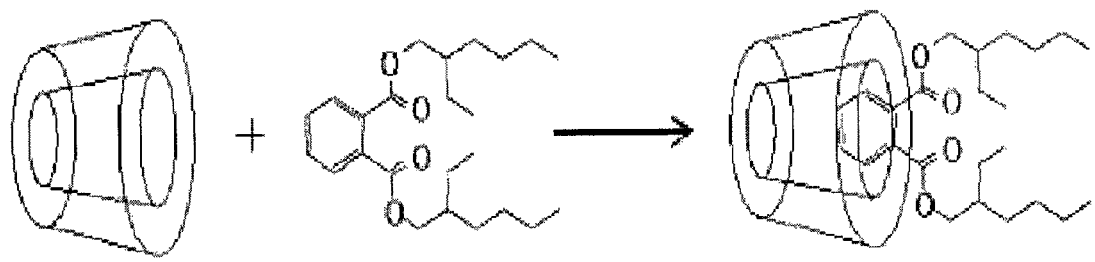
FIG. 2 is a schematic diagram showing a structure of a cyclodextrin derivative which attracts DOP into its cavity to form a complex in a plasticizer composition of the present invention.
Figure 3:
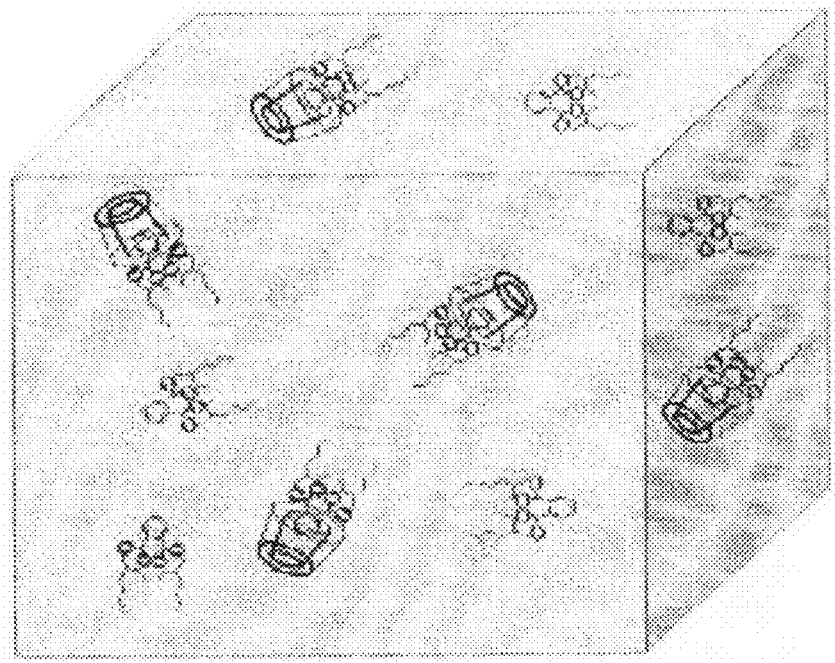
FIG. 3 is a schematic diagram showing a structure of a flexible PVC composition with suppression of the migration of a plasticizer in which PVC, a low molecular weight liquid plasticizer and cyclodextrin derivatives are mixed homogeneously with each other according to the present invention.

FIG. 1 is a schematic diagram showing a structure of α-cyclodextrin derivatives as one example of cyclodextrin derivatives used in the present invention. Referring to FIG. 1, α-cyclodextrin derivatives are structures having a cavity formed therein. Such cyclodextrin derivatives prevents the plasticizer from flowing out of the PVC products since the cyclodextrin derivatives attracts the low molecular weight liquid plasticizer, for example DOP, into their cavity to form a complex (see FIG. 2). That is to say, the flexible PVC composition with suppression of the migration of a plasticizer according to the present invention, in which the PVC, the low molecular weight liquid plasticizer and the cyclodextrin derivatives are mixed homogeneously as shown in FIG. 3, has an improved effect on the suppression of the migration of the plasticizer, and also maintains physical properties without loss of their efficiency since the cyclodextrin derivatives effectively form a complex with DOP.

Hereinafter, preferred embodiments of the present invention will be described in detail with reference to the accompanying drawings. However, the description proposed herein is just a preferable example for the purpose of illustrations only, not intended to limit the scope of the invention, so it should be understood that other equivalents and modifications could be made thereto without departing from the spirit and scope of the invention. The preferred embodiments of the present invention will be described in detail for the purpose of better understandings, as apparent to persons by persons who have ordinary skill in the art.

Synthetic Example 1

In this Synthetic example, β-cyclodextrin was reacted with benzyl chloride to synthesize cyclodextrin derivatives represented by the following Formula 7.

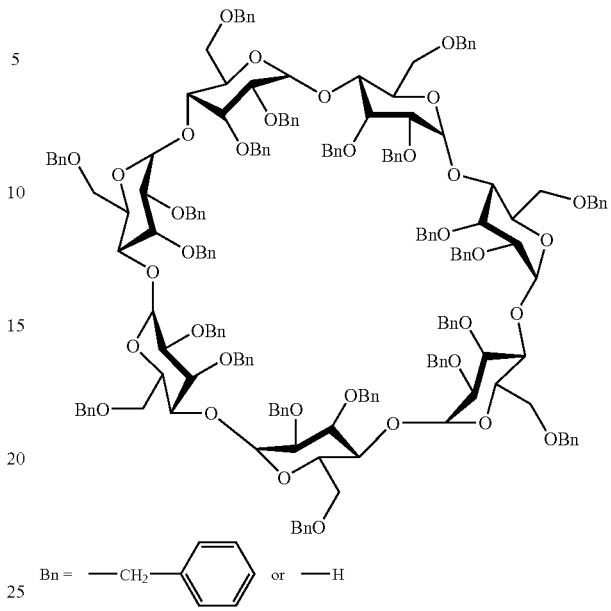

Formula 7

Bn = —CH$_2$—⌬— or —H

The synthesis of 2,3,6-tri-O-benzyl-β-cyclodextrin (hereinafter, referred to as "Bn-β-CD"), represented by Formula 7, was carried out according to the method disclosed in the literature [Carbohydrate Research 1990, Vol. 199, P. 31-35 "Synthesis of 1,4-anhydro-2,3,6-tri-O-benzyl-α-D-glucopyranose by cis-ring-closure of a glycosyl chloride"].

The β-cyclodextrin used in the reaction was purchased from Tokyo Kasei. 5.0 g of the β-cyclodextrin was dissolved in 250 ml of dimethylsulfoxide. Then, 3 g of sodium hydride (NaH) was evenly dispersed in 50 ml of DMSO, and then the resultant mixture was added to the previously prepared β-cyclodextrin solution and stirred at 21° C. Subsequently, 14 ml of benzyl chloride was slowly added to the stirred mixture for 6 hours, and then a precipitate was obtained using water. The precipitate was added in acetone, and then impurities were removed from the precipitate and the impurities-free precipitate was dried to obtain a product containing Bn-β-CD. The dissolution and precipitation processes were repeated using acetone and methanol to obtain a more purified product.

The Bn-β-CD product obtained through the processes was analyzed for contents of carbon, hydrogen, oxygen atoms to calculate a weight ratio of each of the atoms. And, the results are listed in the following Table 1.

On the basis of the results, it was determined how much hydrogen in the terminal hydroxy functional group of the β-cyclodextrin is substituted. As s result, it was revealed that 19 (about 90.5%) of the total 21 functional groups of the β-cyclodextrin are substituted with benzyl chloride during the substitution reaction.

TABLE 1

| Atoms | Carbon | Hydrogen | Oxygen |
|---|---|---|---|
| % by weight | 72.1917 | 6.3808 | 19.2859 |

Synthetic Example 2

In this synthetic example, the β-cyclodextrin was reacted with 3-trimethoxysilylpropylmethacrylate represented by the following Formula 8 to synthesize cyclodextrin derivatives represented by the following Formula 9.

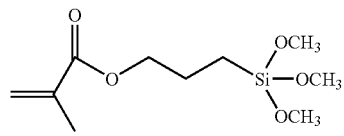

Formula 8

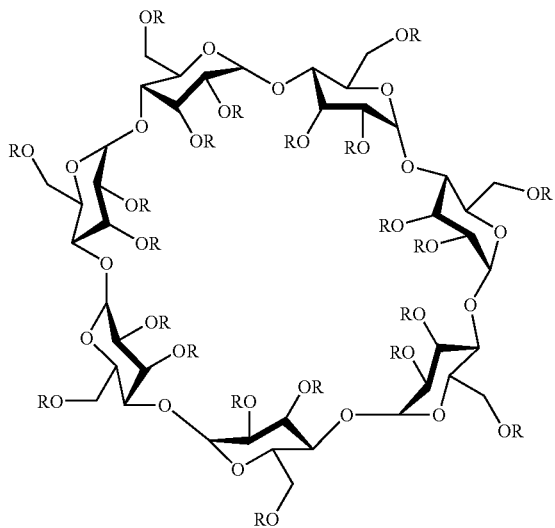

Formula 9

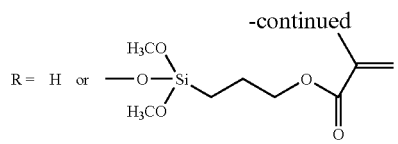

The synthesis of the above cyclodextrin derivatives of Formula 9 was carried out, as follows. Before a modification process of the β-cyclodextrin, moisture was completely removed from the β-cyclodextrin using a Dean-Stock apparatus. 250 ml of N,N-dimethylformamide was added to a 3-neck flask equipped with a reflux tube and a nitrogen inlet, and then 15 g of β-cyclodextrin was also added the flask. The resultant mixture was completely dissolved while stirring. And, the inside of the 3-neck flask was then brought to a vacuum state, and then nitrogen and 15 ml of 3-trimethoxysilylpropylmethacrylate were added sequentially to the 3-neck flask, and reacted for 48 hours at a constant temperature of 80 to 100° C. Subsequently, dimethylformamide was removed by passing the reaction solution through the column, and a precipitate was obtained using acetone, and then dried for a day under a vacuum condition.

EXAMPLES

In these Examples, the cyclodextrin derivatives synthesized in the Synthetic example 1 were used to prepare flexible PVC compositions with suppression of the migration of a plasticizer.

Commercially available PVC (LG Chemicals Ltd., LP170) was used as the PVC, and dioctyl phthalate (hereinafter, referred to as "DOP"), which is one of the typical low molecular weight liquid plasticizers, was used as the plasticizer. SDB CIZER-E03 (ShinDongBang Corp.) was used as epoxidized soybean oil known as the secondary plasticizer, and MT-800 (Songwon Industrial Co., Ltd.) was used as the heat stabilizer.

Firstly, PVC, DOP, and the cyclodextrin derivatives obtained in the Synthetic example 1 were added with a secondary plasticizer and a heat stabilizer as other additives to a container, based on their contents as listed in the following Table 2, and mechanically stirred for 24 hours to form a plastisol. In the Table 2, the contents are represented by a part(s) by weight.

TABLE 2

| | No. | PVC | DOP | Secondary Plasticizer | Heat Stabilizer | Cyclodextrin Derivatives | Total |
|---|---|---|---|---|---|---|---|
| Comparative example 1 | PVC-0 | 100.00 | 57.00 | 3.00 | 2.00 | — | 162.00 |
| Example 1 | PVC-1 | 100.00 | 57.00 | 3.00 | 2.00 | 1.63 | 163.63 |
| Example 2 | PVC-3 | 100.00 | 57.00 | 3.00 | 2.00 | 5.01 | 167.01 |
| Example 3 | PVC-6 | 100.00 | 57.00 | 3.00 | 2.00 | 10.34 | 172.34 |
| Example 4 | PVC-9 | 100.00 | 57.00 | 3.00 | 2.00 | 16.02 | 178.02 |

The resultant plastisol was aged for about 2 weeks in a vacuum oven, and then a suitable amount of the plastisol was added to a mold and the plastisol-containing mold was put into a processing oven, heated at a temperature of 180° C. for about 5 to 10 minutes until it is in a solution phase, and then kept at a room temperature to prepare flexible PVC samples with suppression of the migration of a plasticizer.

The contents of the cyclodextrin derivatives to the total content of the plastisol were represented by percent (%) by weight, and the numbers of the prepared samples were marked according to the contents of the used cyclodextrin derivatives. For example, if flexible PVC samples are prepared, respectively, from plastisols containing 0, 1, 3, 6 and 9% by weight of cyclodextrin derivatives, the flexible PVC samples are named PVC-0, PVC-1, PVC-3, PVC-6 and PVC-9, respectively.

Dispersibility Evaluation of Cyclodextrin Derivatives

Figure 4:
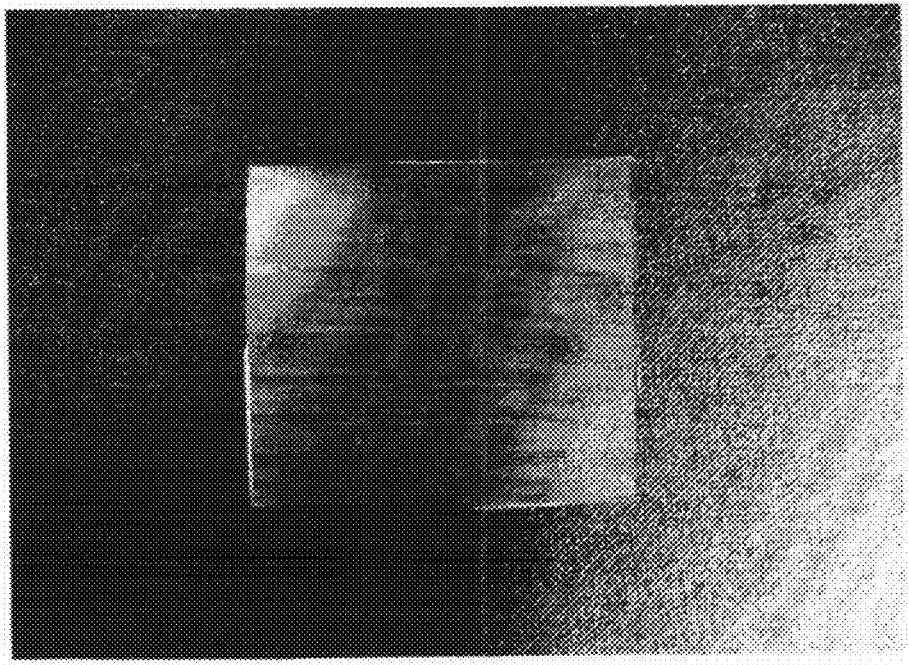
FIG. 4 is a photograph taken of a surface of a cyclodextrin derivatives-free sample (PVC-0) of Comparative example 1.
Figure 5:
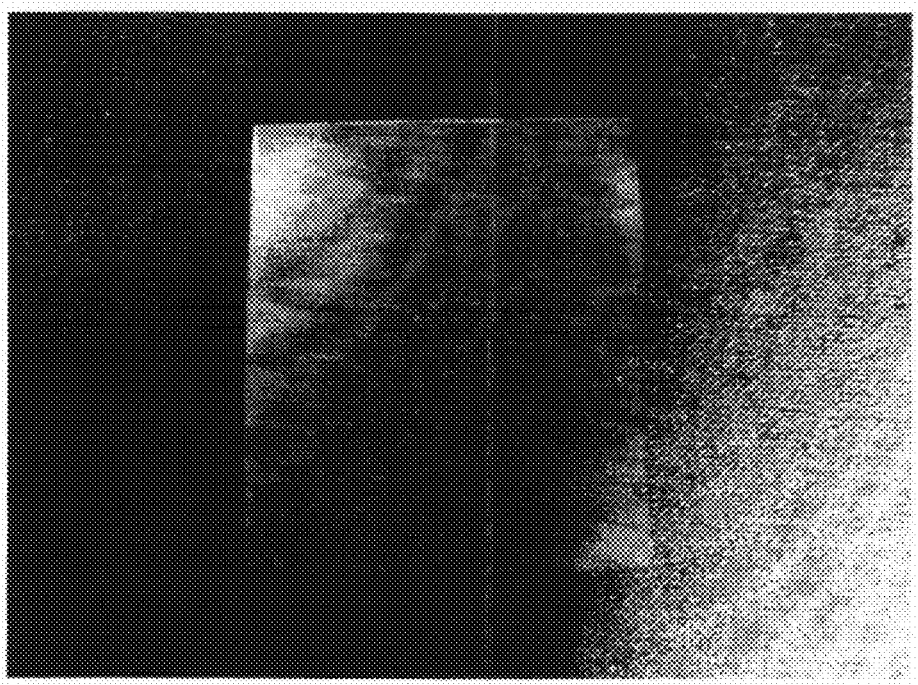
FIG. 5 is a photograph taken of a surface of a sample (PVC-9) of Example 4 containing a small amount of the cyclodextrin derivatives.

FIGS. 4 and 5 are photographs taken of surfaces of a cyclodextrin derivatives-free sample (PVC-0) of Comparative example 1 and a sample (PVC-9) of Example 4 containing a small amount of the cyclodextrin derivatives. Also, FIG. 6 is a photograph taken of a surface of a sample obtained by dispersing pure β-cyclodextrin in a DMAc solvent.

Figure 6:
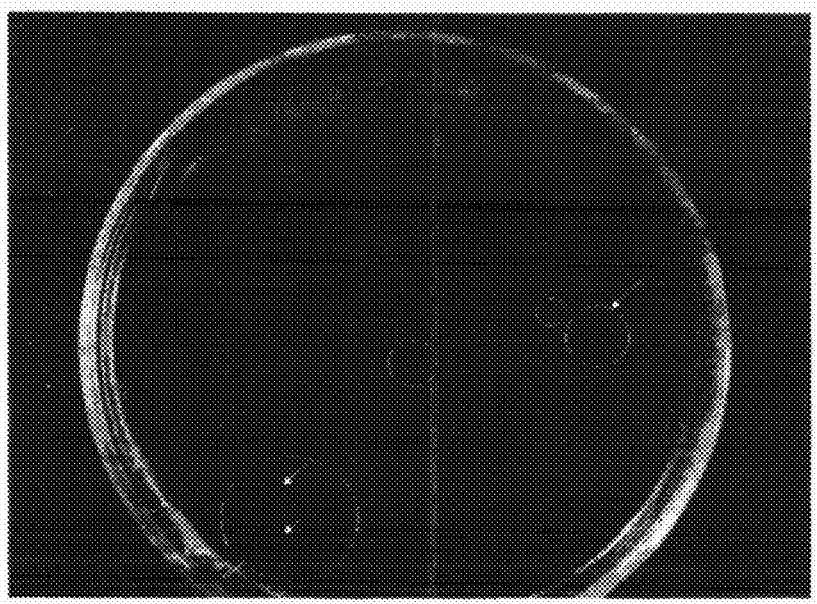
FIG. 6 is a photograph taken of a surface of a sample obtained by dispersing pure β-cyclodextrin in a DMAc solvent according to the prior art.

As shown in FIG. 6, it was determined whether the cohesion, which is pointed out as the problem caused in the manufacturing method of the flexible PVC with suppression of the migration of a plasticizer in the use of the pure β-cyclodextrin, appears in the flexible PVC using the cyclodextrin derivatives according to the present invention. As shown in the photographs, it was revealed that a surface of the PVC-9 is not nearly different to that of the PVC-0, indicating that the cyclodextrin derivatives are homogeneously dispersed without their cohesion.

Migration Evaluation of Plasticizer

The prepared flexible PVC samples were tested for the migration of a plasticizer using a method as described just later. The migration test was carried out according to a modified method ISO (International Standard Organization) 3826 "Plastics collapsible containers for human blood and blood components", which is suitably adapted to this application.

First, in order to determine DOP concentration, various concentrations of standard DOP solutions were prepared according to a procedure as described just later, and a calibration curve was plotted by measuring absorbance of the standard DOP solutions at a wavelength of 272 nm using a UV-vis spectrophotometer.

The standard DOP solutions were prepared at contents of 1, 2, 5, 10 and 20 mg of DOP, respectively, based on 100 ml of a mixed ethyl alcohol/water solution used in the DOP migration test, and their manufacturing method is described in detail, as follows.

The DOP migration solution was prepared by suitably mixing ethyl alcohol and water until a density of the mixed ethyl alcohol/water solution was 0.9373~0.9378 g/ml. At this time, the used ethyl alcohol has a purity of 95.1~96.6% (v/v) and a density of 0.8050~0.8123 g/ml. 1 g of DOP was added to ethyl alcohol and the resultant mixture was adjusted with the migration solution to a final volume of 100 ml. Then, 10 ml of the resultant solution was re-diluted with the migration solution to the entire volume of 100 ml. The re-diluted solution was taken, respectively, in aliquots of 1, 2, 5, 10 and 20 ml, and re-diluted with the migration solution to the entire volume of 100 ml. The above procedures were repeated to prepare standard solutions having a DOP concentration of 1, 2, 5, 10 and 20 mg/100 ml, respectively.

Figure 7:
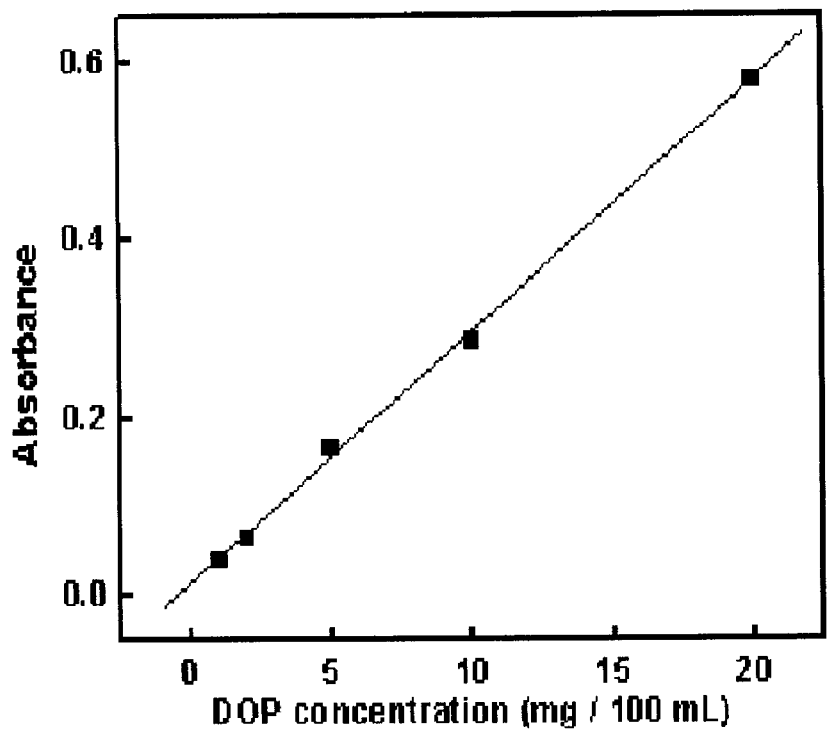
FIG. 7 is an absorbance calibration curve of a standard solution prepared to determine a concentration of a migrated phthalate plasticizer.

The standard solutions prepared thus were measured for their absorbances at a wavelength of 272 nm using a UV-vis spectrophotometer, and then a calibration curve of the standard solutions was plotted using their absorbances, as shown in FIG. 7. It was found that the plotted calibration curve fully complied with a Beer-Lambert equation, and the concentrations of the samples may be calculated from the absorbances of the samples. A Beer-Lambert equation is represented as shown in the following Equation 2.

$$\text{Absorbance} = \log\left(\frac{\text{Intensity of Light Penetrating into Sample}}{\text{Intensity of Light Penetrating out through Sample}}\right)$$

$$= \text{Molar Extinction Coefficient} \times \text{Concentration} \times \text{Light-Penetration Length}$$

Equation 2

The previously manufactured flexible PVC samples were added to 100 g of migration test solutions and sealed, respectively, and then kept at a constant ambient temperature of 37±1° C. And, absorbances of the migrated solutions was measured at a wavelength of 272 nm every predetermined time point using a UV-vis spectrophotometer, and concentrations of DOPs migrated from the samples were calculated by assigning these absorbances to the previously plotted test curve. The results are listed in the following Table 3 and shown in FIG. 8. Units in the following Table 3 are defined in the terms of mg/100 ml.

TABLE 3

| | DOP concentration | | | | |
|---|---|---|---|---|---|
| No. | After 6 hrs | After 12 hrs | After 24 hrs | After 48 hrs | After 72 hrs |
| PVC-0 | 4.393 | 7.916 | 12.490 | 17.814 | 18.028 |
| PVC-1 | 3.568 | 7.156 | 11.023 | 14.652 | 15.361 |
| PVC-3 | 2.439 | 5.131 | 9.402 | 12.116 | 13.349 |
| PVC-6 | 2.360 | 4.782 | 8.063 | 11.512 | 12.519 |
| PVC-9 | 1.819 | 3.760 | 6.758 | 9.945 | 11.244 |

Figure 8:
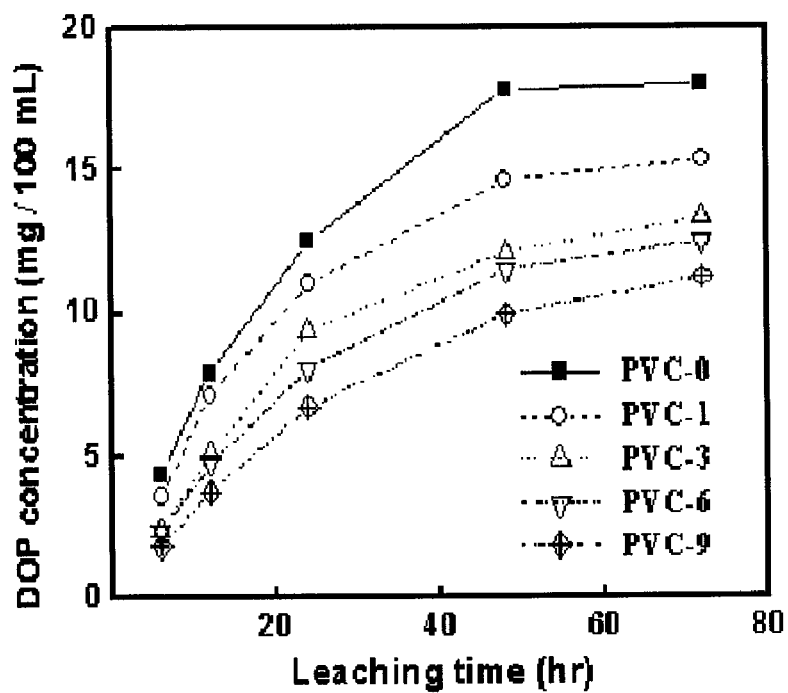
FIG. 8 is a graph showing results of DOP migration tests of PVC samples with suppression of the migration of a plasticizer according to the present invention.

Referring to Table 3 and FIG. 8, it was revealed that the concentrations of the migrated DOPs are decreased as the content of the cyclodextrin derivatives increases, namely as the sample numbers from PVC-0 to PVC-9 increases, indicating that the cyclodextrin derivatives suppress the migration of the plasticizer DOP. In particular, it was revealed that even a small amount of the cyclodextrin derivatives significantly improve an effect of suppressing the migration of a plasticizer, indicating that the cyclodextrin derivatives attract and fix a low molecular weight liquid plasticizer into the outer surface of the cavity by means of hydrogen bonds, in addition to attracting the low molecular weight liquid plasticizer into their cavities.

Physical Property Evaluation of Flexible PVC

This evaluation method was designed to determine an effect of the impregnated cyclodextrin derivatives on mechanical properties of the flexible PVC.

In order to carry out a tensile test of the manufacture flexible PVC, dumbbell shapes of samples were first prepared using a sample cutter, and loads of the prepared samples were measured by elongating the samples at a crosshead speed of 50 mm/min using a Lloyd LR10K universal testing machine (UTM). Measured values of the stress and the strain at breaks are listed in Table 4, and a stress-strain curve plotted from the measured values is shown in FIG. 9.

TABLE 4

| No. | Stress (N/mm$^2$) | Strain (%) |
|---|---|---|
| PVC-0 | 21.05 | 445.17 |
| PVC-1 | 20.29 | 436.65 |
| PVC-3 | 20.01 | 433.81 |
| PVC-6 | 19.83 | 440.78 |
| PVC-9 | 17.44 | 418.40 |

Figure 9:
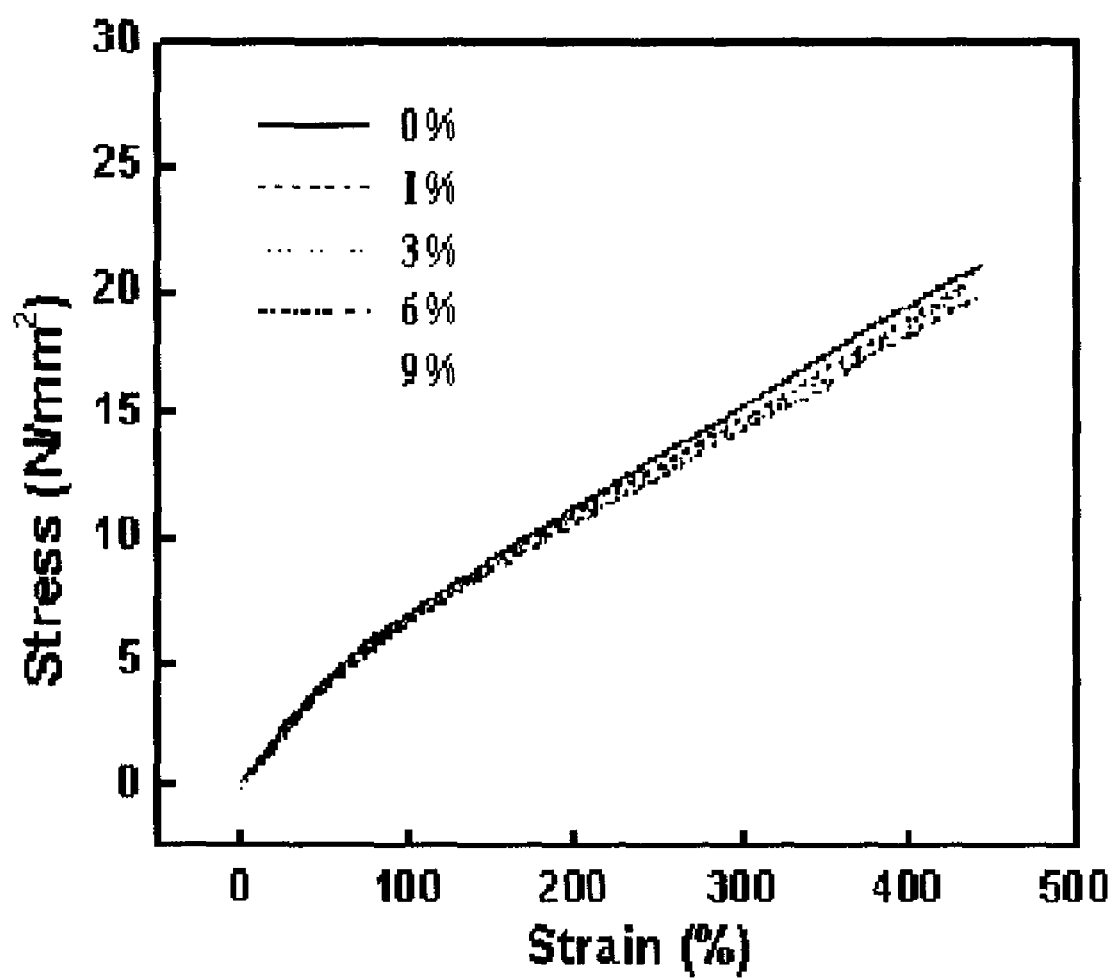
FIG. 9 is a graph showing stress-strain curves of flexible PVC samples with suppression of the migration of a plasticizer according to the present invention.

Referring to Table 4 and FIG. 9, it was reveled that the stress and the strain at breaks are slightly decreased as a concentration of the cyclodextrin derivative, Bn-β-CD, increases, and their total changes are very slight within the range of 10%. From these results, it was confirmed that the mechanical properties of the flexible PVC containing the cyclodextrin derivatives are hardly deteriorated.

INDUSTRIAL APPLICABILITY

As described above, the manufacturing method of the present invention may be useful to mass-produce the flexible PVC with suppression of the migration of a plasticizer in a simple and economic manner without the use of solvents if the cyclodextrin derivatives substituted with a predetermined compound are used as a compound that can form a complex with low molecular weight liquid plasticizers used for the flexible PVC.

Also, the manufactured flexible PVC has an improved effect of suppressing the migration of the plasticizer without deterioration in its mechanical properties by enabling the cyclodextrin derivatives to effectively form a complex with DOP since the low molecular weight liquid plasticizer and the cyclodextrin derivatives are mixed homogeneously with each other.

What is claimed is:

1. A plasticizer composition comprising a low molecular weight liquid plasticizer and cyclodextrin derivatives represented by the following Formula 3:

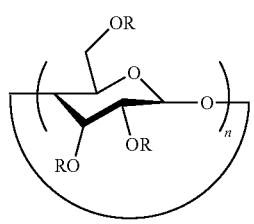

Formula 3 wherein, R is independently selected from the group consisting of hydrogen, a hydrocarbon functional group represented by the formula

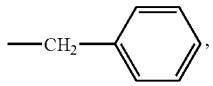

and a silane functional group represented by the formula

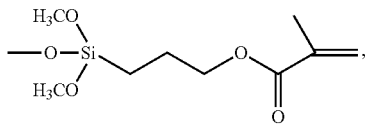

wherein the substituent "R" has a substitution degree of 5 to 100%; and n is an integer from 6 to 26;

provided that the substitution decree is about 90 to 100%, when R is either H or

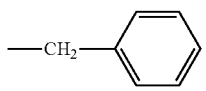

in the Formula 3.

2. The plasticizer composition according to claim 1, wherein the cyclodextrin derivatives have a content of 2 to 20 mol, based on 100 mol of the low molecular weight liquid plasticizer.

3. A flexible PVC composition with suppression of the migration of a plasticizer comprising PVC and a low molecular weight liquid plasticizer, the flexible PVC composition further comprising cyclodextrin derivatives represented by the following Formula 3:

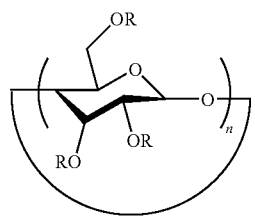

Formula 3 wherein, R is independently selected from the group consisting of hydrogen, a hydrocarbon functional group represented by the formula

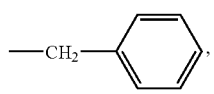

and a silane functional group represented by the formula

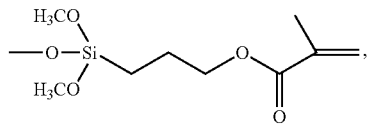

wherein the substituent "R" has a substitution degree of 5 to 100%; and n is an integer from 6 to 26;

provided that the substitution degree is about 90 to 100%, when R is either H or

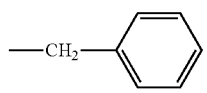

in the Formula 3.

4. The flexible PVC composition with suppression of the migration of a plasticizer according to claim 3, wherein the cyclodextrin derivatives have a content of 2 to 20 mol, based on 100 mol of the low molecular weight liquid plasticizer.

5. The flexible PVC composition with suppression of the migration of a plasticizer according to claim 3, wherein the low molecular weight liquid plasticizer is one selected from the group consisting of a phthalate plasticizer, an aliphatic diester plasticizer, a trimellitate plasticizer and a phosphate plasticizer.

6. The flexible PVC composition with suppression of the migration of a plasticizer according to claim 5, wherein the phthalate plasticizer is one selected from the group consisting of dimethyl phthalate (DMP), dibutyl phthalate (DBP), di-isobutyl phthalate (DIBP), dihexyl phthalate (DHP), dioctyl phthalate (DOP), di-iso-octyl phthalate (DIOP), dinonyl phthalate (DNP), di-isodecyl phthalate (DIDP), benzyl butyl phthalate (BBP) and mixtures thereof.

7. The flexible PVC composition according to claim 3, wherein n in the Formula 3 is an integer from 6 to 8.

8. The flexible PVC composition according to claim 7, wherein

R, each independently, is H or

—CH₂—C₆H₅ in the Formula 3, and the substitution degree at the substituent "R" is about 90%.

9. A method for manufacturing a flexible PVC composition with suppression of the migration of a plasticizer, the method comprising:
(S1) preparing cyclodextrin derivatives represented by the following Formula 3;
(S2) mixing the cyclodextrin derivatives, PVC and a low molecular weight liquid plasticizer to form a plastisol; and
(S3) heating the formed plastisol to form a solution and cooling the solution;

Formula 3 wherein, R is independently selected from the group consisting of hydrogen, a hydrocarbon functional group represented by the formula

—CH₂—C₆H₅, and a silane functional group represented by the formula $$\text{—O—Si(OCH}_3\text{)}_2\text{—CH}_2\text{CH}_2\text{CH}_2\text{—O—C(=O)—C(CH}_3\text{)=CH}_2,$$

wherein the substituent "R" has a substitution degree of 5 to 100%; and n is an integer from 6 to 26;

provided that the substitution degree is about 90 to 100%, when R is either H or

—CH₂—C₆H₅ in the Formula 3.

10. The method for manufacturing a flexible PVC composition with suppression of the migration of a plasticizer according to claim 9, wherein the cyclodextrin derivatives have a content of 2 to 20 mol, based on 100 mol of the low molecular weight liquid plasticizer.

11. The method for manufacturing a flexible PVC composition with suppression of the migration of a plasticizer according to claim 9, wherein the low molecular weight liquid plasticizer is one selected from the group consisting of a phthalate plasticizer, an aliphatic diester plasticizer, a trimellitate plasticizer and a phosphate plasticizer.

12. The method for manufacturing a flexible PVC composition with suppression of the migration of a plasticizer according to claim 11, wherein the phthalate plasticizer is one selected from the group consisting of dimethyl phthalate (DMP), dibutyl phthalate (DBP), di-isobutyl phthalate (DIBP), dihexyl phthalate (DHP), dioctyl phthalate (DOP), di-iso-octyl phthalate (DIOP), dinonyl phthalate (DNP), di-isodecyl phthalate (DIDP), benzyl butyl phthalate (BBP) and mixtures thereof.

13. A method for manufacturing a flexible PVC composition with suppression of the migration of a plasticizer, the method comprising:
(S1) preparing cyclodextrin derivatives represented by the following Formula 3;
(S2) mixing the cyclodextrin derivatives, PVC and a low molecular weight liquid plasticizer to form a plastisol; and
(S3) heating the formed plastisol to form a solution and cooling the solution;

Formula 3 wherein R, each independently, is hydrogen or $$\text{—O—Si(OCH}_3\text{)}_2\text{—CH}_2\text{CH}_2\text{CH}_2\text{—O—C(=O)—C(CH}_3\text{)=CH}_2,$$

wherein the substituent "R" has a substitution degree of 5 to 100%; and n is an integer from 6 to 26.

* * * * *